United States Patent
Brooks

(10) Patent No.: US 10,618,219 B2
(45) Date of Patent: Apr. 14, 2020

(54) ADDITIVE MANUFACTURING APPARATUS AND METHOD

(71) Applicant: RENISHAW PLC, Gloucestershire (GB)

(72) Inventor: Ian Thomas Brooks, Chorley (GB)

(73) Assignee: RENISHAW PLC, Wotton-under-Edge (GB)

( * ) Notice: Subject to any disclaimer, the term of this patent is extended or adjusted under 35 U.S.C. 154(b) by 567 days.

(21) Appl. No.: 15/105,976

(22) PCT Filed: Dec. 22, 2014

(86) PCT No.: PCT/GB2014/053817
§ 371 (c)(1),
(2) Date: Jun. 17, 2016

(87) PCT Pub. No.: WO2015/092442
PCT Pub. Date: Jun. 25, 2015

(65) Prior Publication Data
US 2016/0318257 A1 Nov. 3, 2016

(30) Foreign Application Priority Data

Dec. 20, 2013 (GB) .................. 1322647.7

(51) Int. Cl.
*B29C 67/00* (2017.01)
*B29C 64/386* (2017.01)
(Continued)

(52) U.S. Cl.
CPC .......... *B29C 64/386* (2017.08); *B22F 3/1055* (2013.01); *B23P 6/007* (2013.01);
(Continued)

(58) Field of Classification Search
CPC .................................................. B29C 64/245
See application file for complete search history.

(56) References Cited

U.S. PATENT DOCUMENTS 5,134,569 A * 7/1992 Masters ................ B29C 35/08
156/272.8
6,554,600 B1 4/2003 Hofmann et al.
(Continued)

FOREIGN PATENT DOCUMENTS

CN 1476362 A 2/2004
CN 101541512 A 9/2009
(Continued)

OTHER PUBLICATIONS

Slocum, Alexander, "Kinematic Couplings: A review of design principles and applications", International Journal of Machine Tools and Manufacture 50 (2010), p. 310-327, Available Online Nov. 4, 2009 (Year: 2009).*

(Continued)

*Primary Examiner* — Galen H Hauth
(74) *Attorney, Agent, or Firm* — Oliff PLC

(57) ABSTRACT

A method and apparatus for manufacturing or repairing a part. The method includes building a fixture for retaining the part using an additive manufacturing apparatus, wherein material is consolidated using an energy beam, the fixture built on a build plate retained in a set position within the additive manufacturing apparatus, mounting the part to the fixture and causing the additive manufacturing apparatus to consolidate material onto the part when the build plate, with the fixture and part attached thereto, is retained substantially in the set position.

9 Claims, 7 Drawing Sheets

(51) Int. Cl.

| | | |
|---|---|---|
| *B33Y 10/00* | (2015.01) | |
| *B23P 6/00* | (2006.01) | |
| *F01D 25/28* | (2006.01) | |
| *B29C 73/34* | (2006.01) | |
| *B22F 3/105* | (2006.01) | |
| *B29C 73/00* | (2006.01) | |
| *B29C 64/153* | (2017.01) | |
| *B29C 73/24* | (2006.01) | |
| *B29C 64/40* | (2017.01) | |
| *B29C 35/08* | (2006.01) | |
| *F01D 5/00* | (2006.01) | |
| *B22F 5/04* | (2006.01) | |
| *B33Y 30/00* | (2015.01) | |
| *B33Y 40/00* | (2020.01) | |
| *B33Y 50/02* | (2015.01) | |
| *B29L 9/00* | (2006.01) | |

(52) U.S. Cl.
CPC ............ *B29C 64/153* (2017.08); *B29C 64/40* (2017.08); *B29C 73/00* (2013.01); *B29C 73/24* (2013.01); *B29C 73/34* (2013.01); *B33Y 10/00* (2014.12); *F01D 25/285* (2013.01); *B22F 5/04* (2013.01); *B22F 2003/1056* (2013.01); *B22F 2998/10* (2013.01); *B29C 2035/0838* (2013.01); *B29L 2009/00* (2013.01); *B33Y 30/00* (2014.12); *B33Y 40/00* (2014.12); *B33Y 50/02* (2014.12); *F01D 5/005* (2013.01); *Y02P 10/295* (2015.11)

(56) References Cited

U.S. PATENT DOCUMENTS

| | | | |
|---|---|---|---|
| 6,621,039 B2 | 9/2003 | Wang et al. | |
| 6,824,714 B1 | 11/2004 | Turck et al. | |
| 8,113,895 B2 | 2/2012 | Watanabe | |
| 8,163,224 B2 | 4/2012 | Higashi et al. | |
| 2003/0043360 A1 | 3/2003 | Farnworth | |
| 2005/0173855 A1* | 8/2005 | Dunn | B29C 64/40 269/291 |
| 2007/0023977 A1* | 2/2007 | Braun | B22F 3/1055 264/497 |
| 2009/0271985 A1 | 11/2009 | Lange | |
| 2010/0038268 A1 | 2/2010 | Reynolds et al. | |
| 2011/0077760 A1 | 3/2011 | Schmidt et al. | |
| 2012/0223306 A1 | 9/2012 | Mittendorf et al. | |
| 2014/0302188 A1 | 10/2014 | Rix et al. | |

FOREIGN PATENT DOCUMENTS

| | | |
|---|---|---|
| CN | 101585233 A | 11/2009 |
| DE | 102012011217 A1 | 12/2013 |
| EP | 2495397 A2 | 9/2012 |
| JP | H09-29848 A | 2/1997 |
| JP | 2000-094529 A | 4/2000 |
| JP | 2003/507224 A | 2/2003 |
| JP | 3477617 B2 | 12/2003 |
| JP | 2013-067036 A | 4/2013 |
| WO | 2007/069746 A1 | 6/2007 |
| WO | 2010/007396 A1 | 1/2010 |
| WO | 2013/064767 A1 | 5/2013 |
| WO | 2013/160188 A1 | 10/2013 |
| WO | 2013/167903 A1 | 11/2013 |

OTHER PUBLICATIONS

Oct. 27, 2017 Office Action issued in European Patent Application No. 14 828 502.6.
Oct. 30, 2017 Office Action issued in Chinese Patent Application No. 201480075890.0.
Apr. 7, 2015 International Search Report issued in International Patent Application No. PCT/GB2014/053817.
Apr. 7, 2015 Written Opinion issued in International Patent Application No. PCT/GB2014/053817.
Nov. 10, 2014 Search Report issued in British Patent Application No. 1322647.7.
Jun. 19, 2014 Search Report issued in British Patent Application No. 1322647.7.
Jun. 8, 2018 Office Action issued in European Patent Application No. 14 828 502.6.
Feb. 27, 2017 Office Action issued in Chinese Patent Application No. 201480075890.0.
Braddick, H.J.J., "Mechanical Design of Laboratory Apparatus." Insititute of Physics, pp. 5-31, 1960.
Nov. 13, 2018 Office Action issued in Japanese Application No. 2016-541505.

* cited by examiner

ADDITIVE MANUFACTURING APPARATUS AND METHOD

FIELD OF INVENTION

This invention concerns an additive manufacturing apparatus and method. The invention has particular, but not exclusive application to an apparatus and a method for supplementing or repairing a pre-formed part by consolidating material directly on to the pre-formed part using an additive manufacturing process.

BACKGROUND

It is desirable to repair parts, such as turbine blades, using additive manufacturing, such as selective laser melting/sintering (SLM/SLS). To carry out such a repair, the blade must be mounted within a build chamber of an additive manufacturing apparatus in a known position such that required scan paths for the laser beam can be determined.

SUMMARY OF INVENTION

According to a first aspect of the invention there is provided a method of manufacturing or repairing a part comprising:—building a fixture for retaining the part using an additive manufacturing apparatus, wherein material is consolidated using an energy beam, the fixture built on a build plate retained in a set position within the additive manufacturing apparatus, mounting the part to the fixture and causing the additive manufacturing apparatus to consolidate material onto the part when the build plate, with the fixture and part attached thereto, is retained substantially in the set position.

A position of the fixture relative a coordinate system of the energy beam is known because the fixture has been manufactured using the additive manufacturing apparatus. Accordingly, if a part geometry is known, a position of the part relative to the fixture is known and the fixture remains/is positioned at substantially the same set position in which it was formed, a scan path for the energy beam for consolidating material on the part may be determined from the data used to generate the fixture. In this way, aligning of the energy beam coordinate system with the part may be facilitated.

The part geometry may be determined by measuring the part. For example, the part may be measured using a contact probe of a coordinate measuring machine. Alternatively, the geometry of the part may be known from geometrical data, such as a CAD or STL model.

The method may comprise measuring the part and the fixture to determine a position of the part relative to the fixture, determining a scan path for the energy beam from the determined position of the part relative to the fixture and directing the energy beam along the determined scan path to consolidate the material onto the part.

Alternatively, the fixture may comprise formations that ensure the part is mounted in the fixture in a predetermined position. In such an embodiment, measurement of the part may not be required and the scan path used to consolidate material on the part may be based on the assumption that the part is mounted in the predetermined position.

The build plate may be removably locatable in a build chamber of the additive manufacturing apparatus. The build plate may comprise mounting formations complimentary to mounting formations located in the build chamber to enable mounting of the build plate in a repeatable position within the build chamber. The mounting formations may form a kinematic mount. A kinematic mount may constrain the position of the build plate in six degrees of freedom. In this way, the build plate can be removed from the apparatus for measuring of the part and fixture and then placed back into the set position within the apparatus through engagement of the mounting formations. The build plate and/or mounting formations may be arranged to constrain mounting of the build plate in the build chamber to a single orientation. It may not be necessary to know the position of the build plate in the build chamber, but simply that, after removal and reinsertion, the build plate with the fixture attached is positioned in substantially the same position as before such that the position of the fixture is known relative to a coordinate system used in forming the fixture.

The method may comprise building the fixture based upon a fixture model, such as an STL model, generating, from measurement data obtained during the measurement step and the fixture model, a combined fixture and part model and determining the scan path from the combined fixture and part model. The method may comprise measuring datum features on the fixture and aligning (in software) the measurement data with the fixture model using the measurement data for the datum features. The scan path may be determined from the measurement data after alignment.

The measurement data for the part may be compared to a nominal part model and the scan path is determined to consolidate material based on differences between the measurement data and the nominal part model. For example, such a method may be used to repair the part, such as to reform worn areas of the part.

The method may be carried out simultaneously for a plurality of parts within a single additive manufacturing apparatus. For example, the method may comprise building multiple fixtures on a single build plate, each for retaining at least one of the parts, mounting the parts in the fixtures, measuring each combination of the at least one part and the fixture to determine a position of the at least one part relative to the fixture, determining a scan path for the energy beam from the position of the at least one part relative to the fixture and causing the additive manufacturing apparatus to consolidate material onto the at least one part by directing the energy beam along the scan path when the build plate, with the fixture and at least one part attached thereto, is retained substantially in the set position.

The fixture may comprise mounting formations for engaging with mounting formations on the part. The mounting formations may comprise screw threads, protrusions that are press fit into complementary recesses on the part (or recesses into which protrusions on the part are press-fit) or the like.

According to a second aspect of the invention there is provided a method for determining a scan path for an energy beam of an additive manufacturing apparatus, comprising receiving measurement data of a part and fixture when the part is mounted in the fixture, the fixture built using an additive manufacturing apparatus, wherein material is consolidated using the energy beam, the fixture built on a build plate retained in a set position within an additive manufacturing apparatus, determining from the measurement data a position of the part relative to the fixture, determining a scan path for the energy beam to consolidate material onto the part when the part, mounted to the fixture, is located in the additive manufacturing apparatus with the build plate in the set position, the scan path determined from the position of the part relative to the fixture.

According to a third aspect of the invention there is provided a data carrier having instructions thereon, which, when executed by a processor, cause the processor to carry out the method of the second aspect of the invention.

The data carrier of the above aspects of the invention may be a suitable medium for providing a machine with instructions such as non-transient data carrier, for example a floppy disk, a CD ROM, a DVD ROM/RAM (including—R/-RW and +R/+RW), an HD DVD, a Blu Ray™ disc, a memory (such as a Memory Stick™, an SD card, a compact flash card, or the like), a disc drive (such as a hard disc drive), a tape, any magneto/optical storage, or a transient data carrier, such as a signal on a wire or fibre optic or a wireless signal, for example a signals sent over a wired or wireless network (such as an Internet download, an FTP transfer, or the like).

According to a fourth aspect of the invention there is provided additive manufacturing apparatus for forming a 3-dimensional object layer-by-layer comprising a build support onto which a removable base plate is mountable, a material dispenser for forming material in layers across the removable base plate when mounted on the build support and an optical module for directing an energy beam onto layers of material formed on the removable base plate, wherein the build support comprises mounting formations co-operable with mounting formation on the base plate such that the base plate is mountable in a repeatable position on the build support.

The mounting formations may be kinematic mounting formations that constrain the position of the base plate in six degrees for freedom. The kinematic formations may comprise three pairs of complimentary formations, such as three pairs of balls and rollers.

According to a fifth aspect of the invention there is provided a build plate for mounting in an additive manufacturing apparatus according to the fourth aspect of the invention, the build plate comprising mounting formations co-operable with mounting formation on the build support such that the base plate is mountable in a repeatable position on the build support.

DESCRIPTION OF EMBODIMENTS

Figure 1:
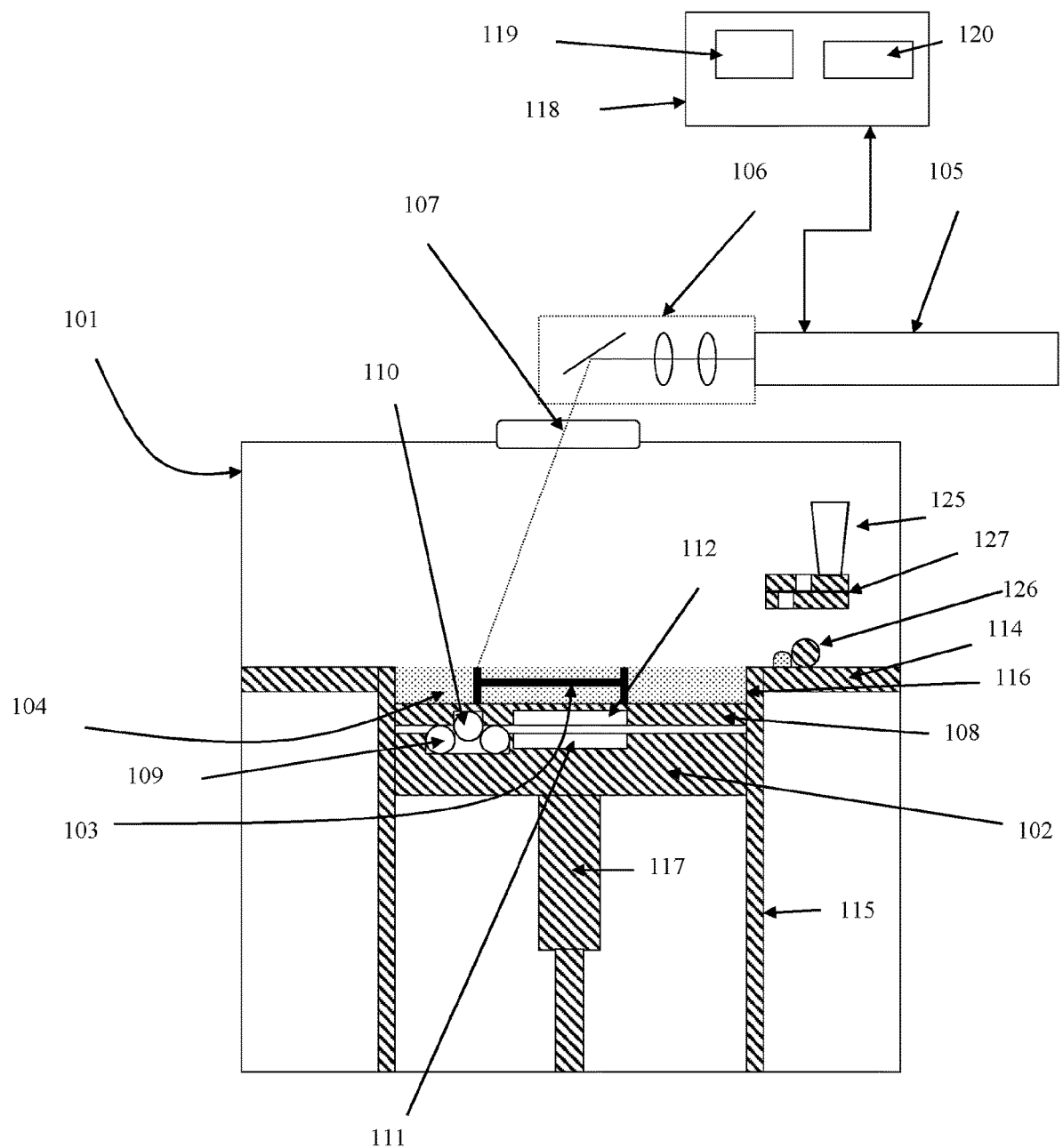
FIG. 1 is an additive manufacturing apparatus according to an embodiment of the invention.
Figure 2A:
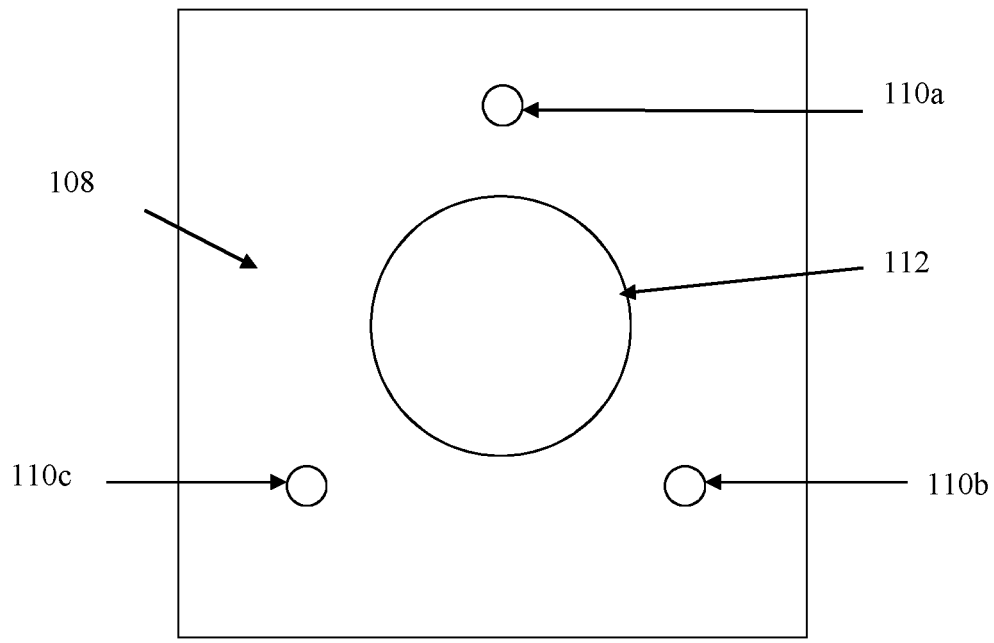
FIGS. 2a and 2b are plan views of the build plate and build support of the additive manufacturing apparatus shown in FIG. 1.
Figure 2B:
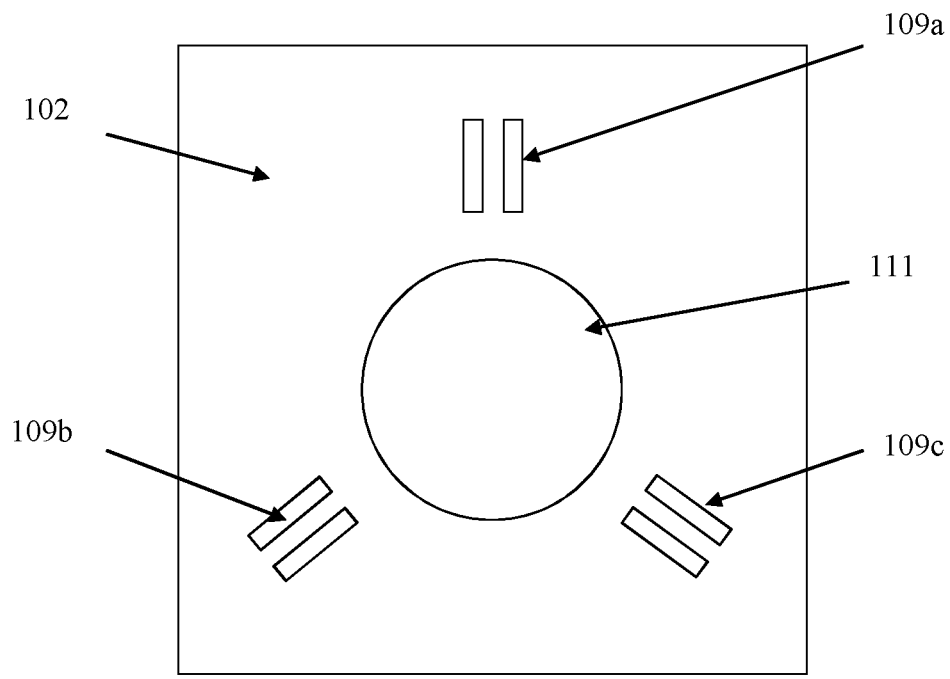
Figure 3:
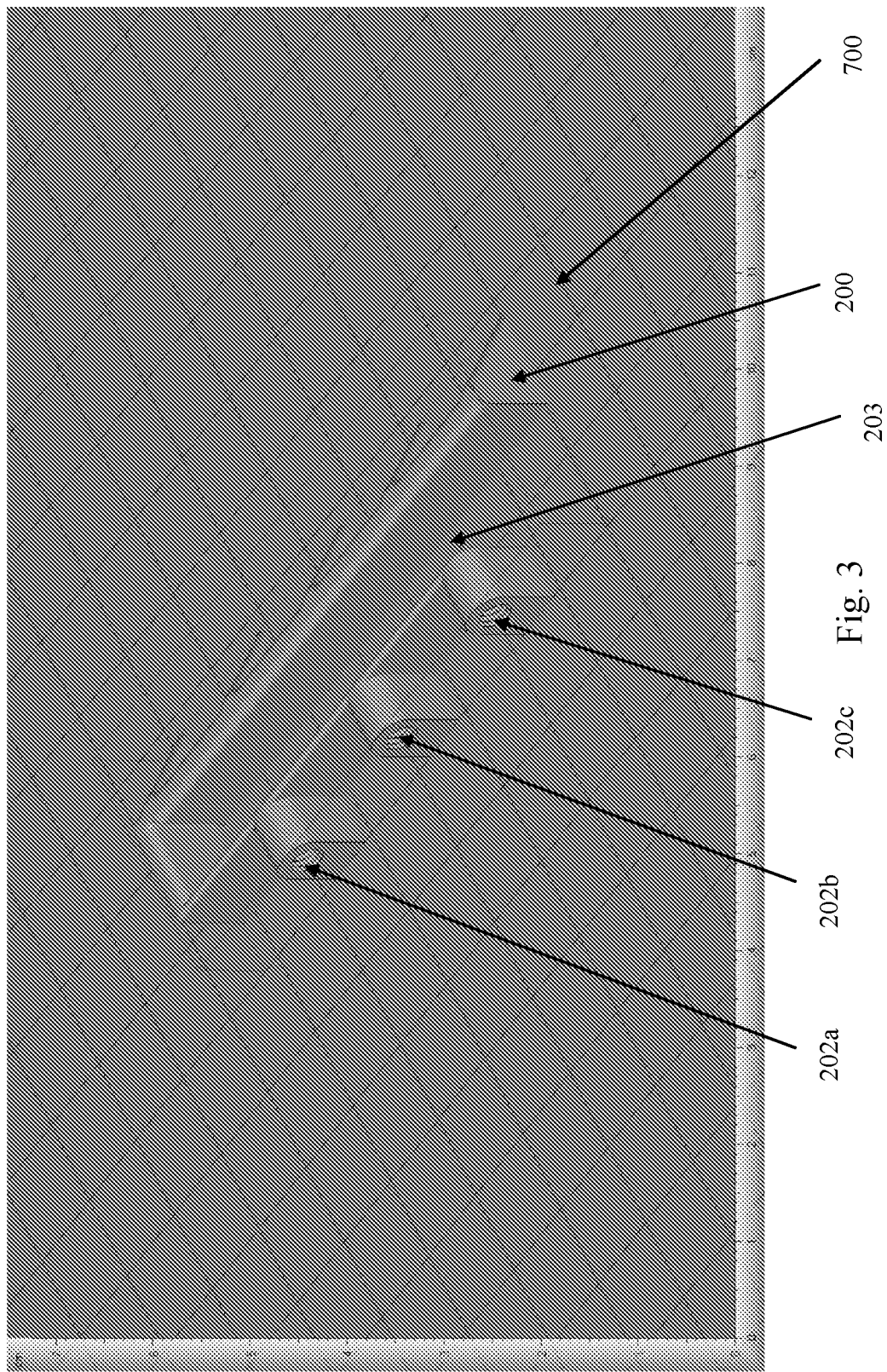
FIG. 3 shows a model of a fixture according to an embodiment of the invention.
Figure 4:
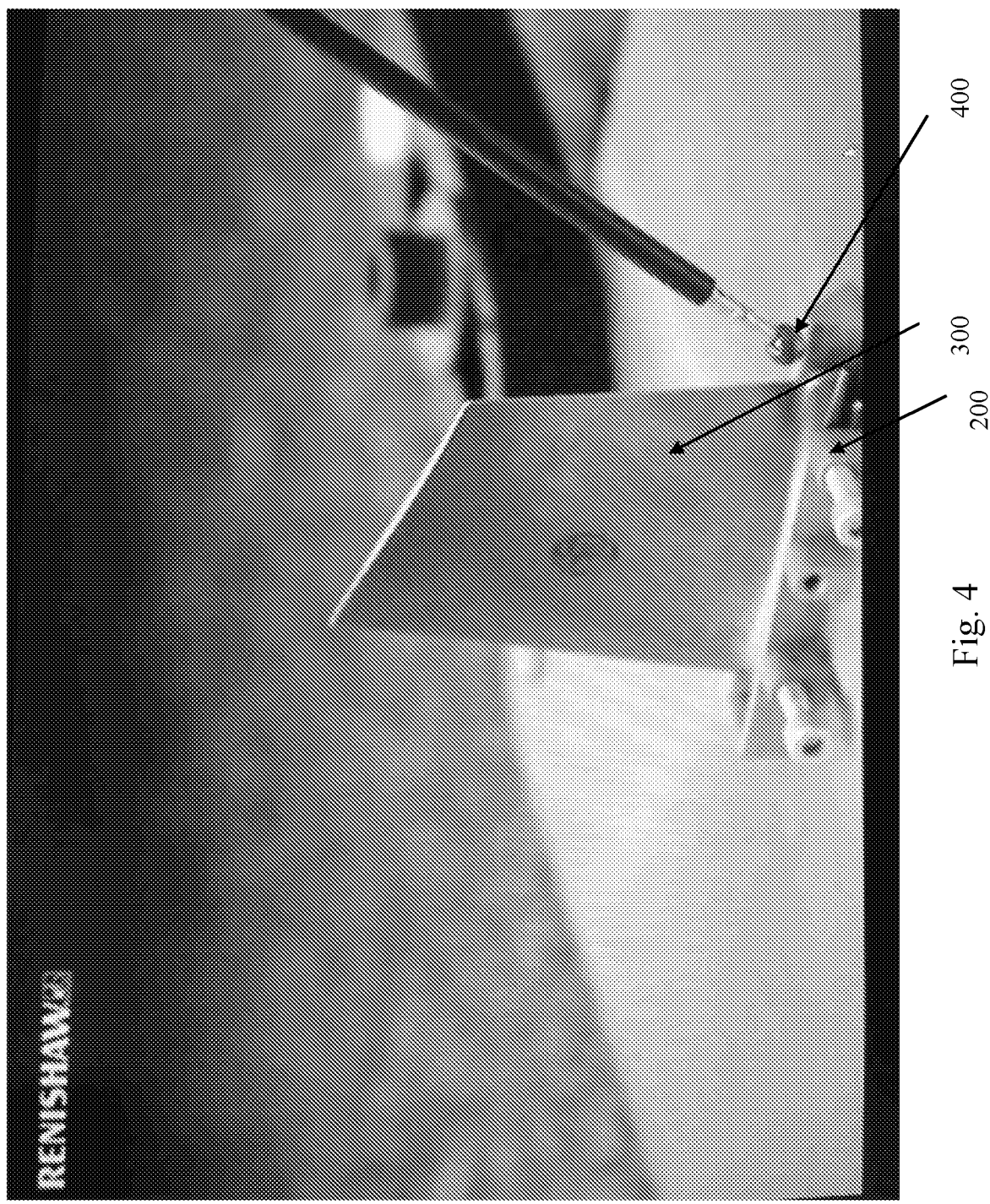
FIG. 4 is a blade mounted to the fixture in accordance with an embodiment of the invention.
Figure 5:
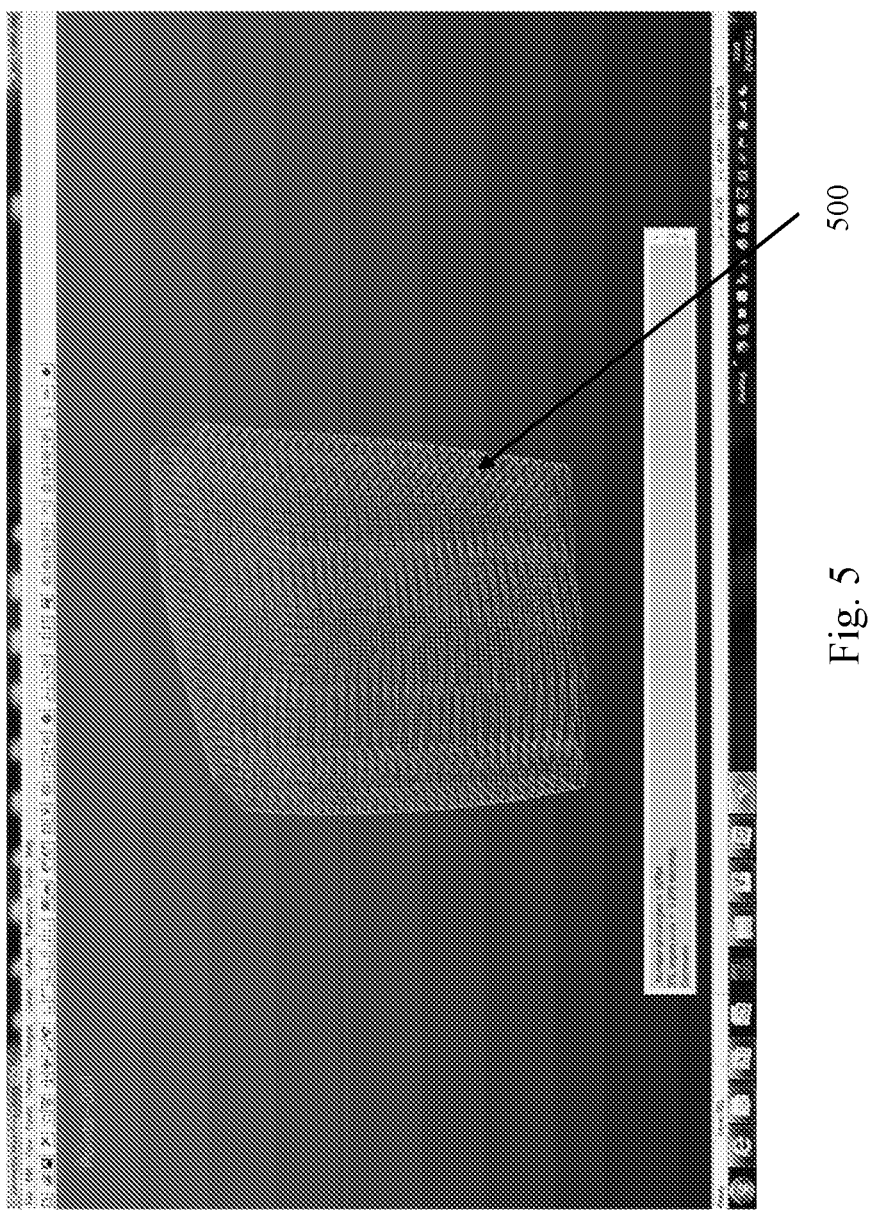
FIG. 5 is a cloud of measurement points obtained for the blade.
Figure 6:
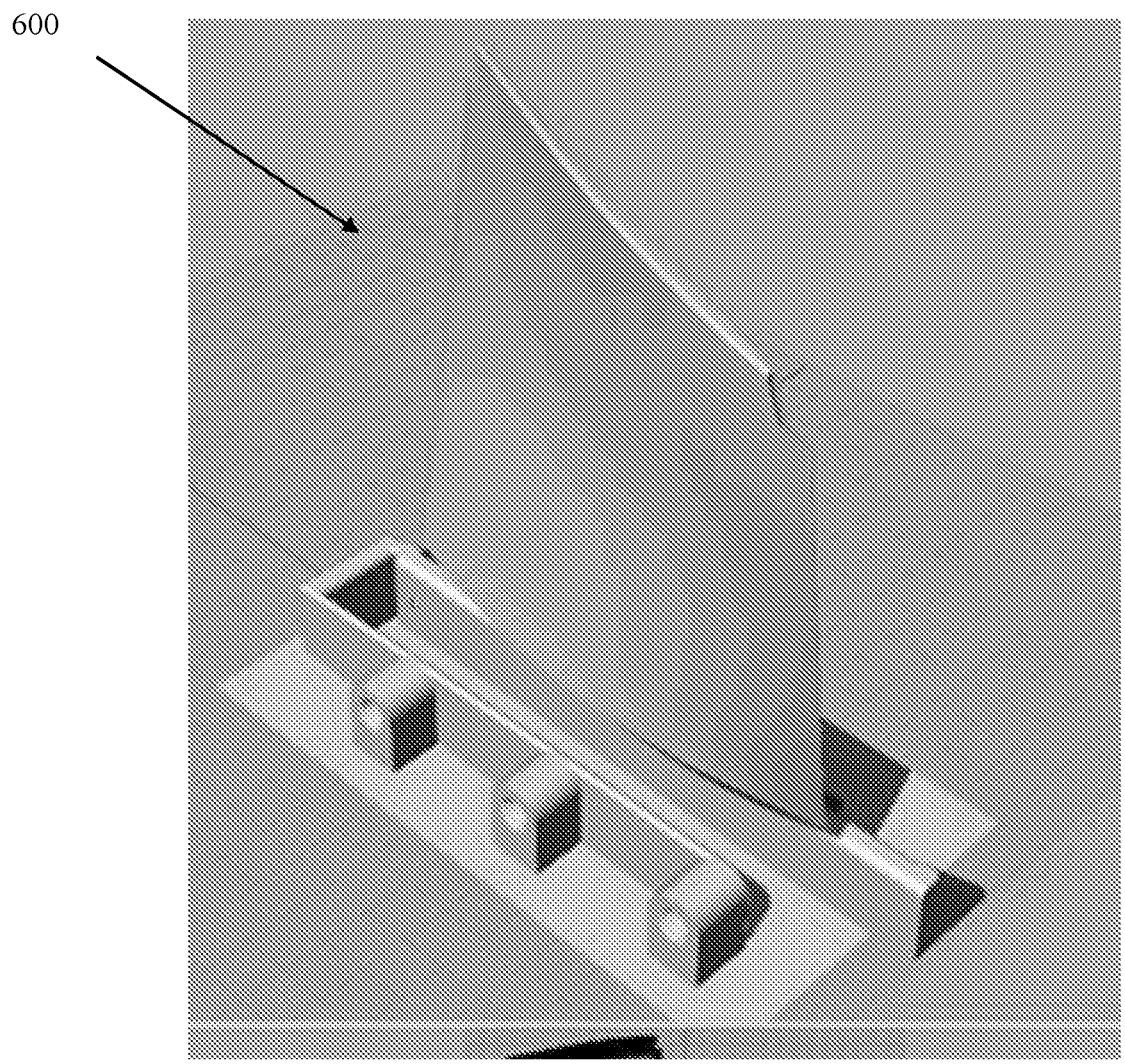
FIG. 6 is a CAD model of the blade and fixture determined from the cloud of measurement points.
Figure 7:
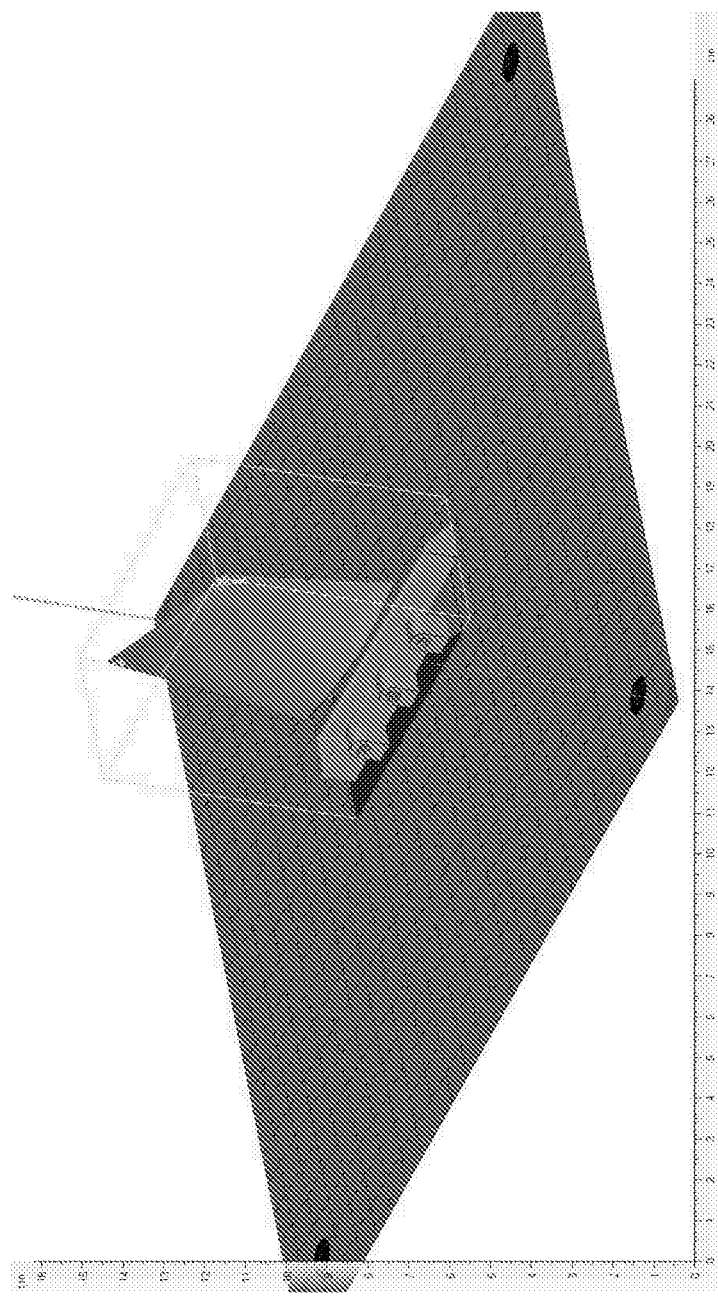
FIG. 7 is an STL model of the blade and fixture.

Referring to FIGS. 1, 2a and 2b, an additive manufacturing apparatus according to an embodiment of the invention comprises a build chamber 101 having therein partitions 114, 115 that define a build volume 116 and a surface onto which powder can be deposited. A build support 102 defines a working area in which an object 103 is built by selective laser melting powder 104. The build support 102 is capable of being lowered within the build volume 116 using mechanism 117 as successive layers of the object 103 are formed. A build volume available is defined by the extent to which the build support 102 can be lowered into the build volume 116. Layers of powder 104 are formed as the object 103 is built by dispensing apparatus comprising powder hopper 125, metering device 127 and a wiper 126. For example, the metering device 127 may be as described in WO2010/007396. A laser module 105 generates a laser for melting the powder 104, the laser directed onto the powder bed 104 as required by optical module 106 under the control of a computer 118. The laser enters the chamber 101 via a window 107.

Computer 118 comprises a processor unit 119 and memory 120 and a data connection to modules of the laser melting apparatus, such as optical module 106, laser module 105 and motors (not shown) that drive movement of the dispensing apparatus and build support 102. The computer 118 controls the laser unit 105, optical unit 106 and movement of build platform 102 based upon the scanning instructions stored in memory 120.

A door (not shown) is provided in the chamber 101 for removing the object therefrom.

A build plate 108 is removably mounted on the build support 102. The build support 102 and build plate 108 comprise complementary mounting formations 109 and 110, respectively, for locating the build plate 108 in a set position on the build support 102. In this embodiment, the mounting formations 109 and 110 form a kinematic mount. In particular, the build plate 108 comprises three spaced apart balls 110a, 110b and 110c arranged for engaging complementary grooves in the build support 102, each formed by a pair of parallel cylinders 109a, 109b and 109c. Engagement of the balls in the grooves constrains the position of the build plate 108 in six degrees of freedom.

Magnets 111, 112 are provided on the build plate 108 and build support 102 such that the build plate 108 is urged towards the build support by the attractive forces of the magnets 111, 112.

The method of the invention will now be described with reference to FIGS. 3 to 7. A build plate 108 is mounted onto the support plate 102 such that the mounting formations 109, 110 are engaged to locate the build plate 108 in a set position relative to the build support 102. The orientation of the build support 102 may be adjusted to ensure that a surface of the build plate 108 is parallel to a plane in which powder is spread across the build plate 108. Alternatively, the wiper may be adjusted such that the wiper is parallel with a plane of the base plate 108.

A fixture 200 is built on the base plate 108 using additive manufacturing based on a geometric model 700 of the fixture. The fixture 200 comprises a slot 203 for receiving a part, in this embodiment a blade, and means for securing the part in the fixture in the form of threaded holes 202a, 202b, 202c arranged to receive bolts.

Once the fixture 200 is formed, powder is removed from the build plate 108 and the part 300 is mounted in the fixture 200 within the additive manufacturing machine. In the case of repair of a part, such as the blade 300 shown in the drawings, the blade 300 may first be machined into an appropriate shape for repair. For example, the part may be modified by wire electrical discharge machining (EDM), to provide a straight upper surface of the part 300 for alignment with the plane of the layers of material formed using the wiper when mounted in the fixture 200. The machining may be carried out within the additive manufacturing apparatus, with the build plate remaining mounted in the set position. Alternatively, the base plate 108 may be removed from the additive manufacturing apparatus for machining and/or measurement of the part 300, the kinematic mounting formations 109, 110 allowing the base plate 108 to be remounted on the build support 102 to locate the base plate 102 in substantially the same position on the build support in which the fixture 200 was formed.

The part 300 and fixture 200 are measured using a measurement probe 400, such as touch trigger or scanning contact probe. The probe may be mounted on an articulating head, such as a Revo 5-axis head as sold by Renishaw plc, and/or coordinate measuring machine (CMM) for moving the probe 300 around the part and fixture 200. A cloud of measurement points 500 are obtained (see FIG. 5) and a CAD model 600 of the part and fixture is produced from the measurement points 500 and the pre-existing CAD model 700 of the fixture. An alignment of the part model with the fixture model can be achieved from measurement data of datum points on the fixture 200.

The combined CAD model 600 of the fixture and part is then imported into software for determining a scan path for the laser beam of the additive manufacturing apparatus to take to repair the part. For example, the model determined from the measurement data may be compared to an ideal/nominal model of the part to determine portions of the part that should be built/rebuilt. Once these portions have been determined, at least these portions are sectioned to determine layers to be formed in the additive manufacturing process and scan paths are determined for each layer.

The part mounted in the fixture is located in the additive manufacturing apparatus. The build support 102 is lowered such that the straight upper surface of the part is level with the top of the build volume 116. Powder is dumped into the build volume 116 to fill the build volume. The additive manufacturing apparatus is then activated to consolidate material onto the part based upon the determined scan paths.

With this method, the fixture grown in the additive manufacturing apparatus provides a means for aligning the part in a known orientation within the apparatus. Accordingly, as long as the relative positions between the part 300 and fixture 200 are known material can be consolidated on the part as desired. If the part was located within the additive manufacturing apparatus by a fixture not manufactured using the apparatus, a separate alignment process would have to be carried out for determining a location of the part relative to a coordinate system of the optical module which directs the laser beam. Such an alignment process would be complex and time consuming. Furthermore, if multiple parts are to be repaired/modified in a single build, multiple fixtures are required. If an alignment process had to be carried out, it would have to be carried out on each part separately. By carrying out the method of the invention, multiple fixtures can be grown on a single base plate such that multiple parts can be repaired/modified in a single build.

Modifications and alterations to the above described embodiment may be made without departing from the invention as defined herein. For example, the fixture may be arranged to secure the part in a known position relative to the fixture. With such an arrangement, it may not be necessary to measure the fixture and part in order to determine their relative positions.

The part may be machined such that the machined part has a known shape. Accordingly, it may not be necessary to compare a measured shape of the machined part to a nominal shape to identify differences as the portion that needs to be built has been predetermined from the machining step. Thus, a scan path may be determined for repairing/modifying the part from the nominal model of the part and based on a known location on the model down to which the part has been machined.

In a further arrangement, in which the base plate cannot be mounted in the build chamber in a repeatable manner, a sacrificial fixture may be manufactured on the base plate and the base plate removed from the additive manufacturing apparatus. A part may then be mounted in the fixture and the fixture and part measured. A data model of the sacrificial fixture and part may then be formed from the measurements. A further fixture may then be built in the additive manufacturing apparatus, identical to the sacrificial fixture. Without removing the base plate with further fixture attached from the additive manufacturing apparatus, the part is swapped from the sacrificial fixture to the further fixture. Material may then be consolidated on the part based on the assumption that the combination of the part and the further fixture is substantially the same as the measured combination of the part and the sacrificial fixture. Multiple parts may be measured in a single sacrificial fixture and multiple further fixtures, identical to the sacrificial fixture, grown on a single base plate such that material can be consolidated on the multiple parts in a single build.

In another embodiment, the fixture may be manufactured with kinematic mounting features to allow the part to be mounted in a repeatable position on the fixture.

The fixture may be built of a different material to the part, for example to allow for the different requirements of the fixture and the part.

The fixture and/or part may be manufactured with features that can be optically recognised such that the location of the part relative to the fixture may be determined from the location of these optically recognisable features. For example, the additive manufacturing apparatus may comprise one or more cameras for imaging the fixture and the part, the location of the fixture and the part determinable from the images.

The invention claimed is:

1. An additive manufacturing apparatus for forming a 3-dimensional object layer-by-layer, the apparatus comprising:
   a build chamber defining a build volume;
   a build support onto which a removable build plate is mountable, the build support being positioned within the build volume;
   a material dispenser for forming material in layers across the removable build plate when the build plate is mounted on the build support; and
   an optical module for directing an energy beam onto layers of the material formed on the removable build plate,
   wherein the build support comprises mounting formations co-operable with mounting formations on the build plate, the mounting formations arranged to form a kinematic mount, such that the build plate is mountable in a repeatable position on the build support defined in six degrees of freedom; and
   wherein the build support is moveable within the build volume.

2. An additive manufacturing apparatus according to claim 1, wherein the mounting formations on the build support and on the build plate are three pairs of complementary formations.

3. An additive manufacturing apparatus according to claim 2, wherein each pair of the three pairs of complementary formations comprises a ball and complementary groove.

4. An additive manufacturing apparatus according to claim 3, wherein each complementary groove is formed by a pair of parallel cylinders.

5. An additive manufacturing apparatus for forming a 3-dimensional object layer-by-layer, the apparatus comprising:
- a build chamber defining a build volume;
- a build support onto which a removable build plate is mountable, the build support being positioned within the build volume;
- a material dispenser for forming material in layers across the removable build plate when the removable build plate is mounted on the build support; and
- an optical module for directing an energy beam onto layers of the material formed on the removable build plate,
- wherein the build support comprises mounting formations co-operable with mounting formations on the build plate to locate the build plate on the build support;
- wherein the mounting formations on one of the build plate and the build support comprise three grooves and the mounting formations on the other of the build support and the build plate comprise three projections arranged such that a location of the build plate when mounted on the build support is constrained solely by contact of the three projections with the three grooves; and
- wherein the build support is moveable within the build volume.

6. An additive manufacturing apparatus according to claim 5, wherein a longitudinal axis of each of the three grooves is aligned such that lines along the longitudinal axes intersect substantially at a centre point of the build plate.

7. An additive manufacturing apparatus according to claim 5, wherein each of the three projections narrows towards a free end that is received in a corresponding one of the three grooves when the build plate is mounted on the build support.

8. An additive manufacturing apparatus according to claim 7, wherein each of the three projections comprises a circular cross-section such that the projection only contacts the corresponding one of the three grooves at two locations on the circular cross-section when the build plate is mounted on the build support.

9. An additive manufacturing apparatus according to claim 7, wherein each of the three projections comprises a hemisphere.

* * * * *